United States Patent
Parfondry et al.

(10) Patent No.: US 6,579,912 B2
(45) Date of Patent: Jun. 17, 2003

(54) PROCESS FOR PREPARING A FLEXIBLE POLYURETHANE FOAM

(75) Inventors: Alain Parfondry, Brussels (BE); Jianming Yu, Brussels (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/198,674

(22) Filed: Jul. 18, 2002

(65) Prior Publication Data

US 2003/0060528 A1 Mar. 27, 2003

Related U.S. Application Data

(63) Continuation of application No. PCT/EP01/05626, filed on May 17, 2001.

(51) Int. Cl.$^7$ ................................................. C08G 18/14
(52) U.S. Cl. ........................ 521/174; 521/130; 521/170
(58) Field of Search ................................. 521/130, 170, 521/174

(56) References Cited

U.S. PATENT DOCUMENTS

| | | | | |
|---|---|---|---|---|
| 5,773,483 A | * | 6/1998 | Eling et al. | 521/125 |
| 5,863,961 A | * | 1/1999 | Jacobs et al. | 521/174 |
| 6,034,197 A | * | 3/2000 | Mahon et al. | 521/174 |
| 6,133,481 A | * | 10/2000 | Singh et al. | 568/25 |

* cited by examiner

*Primary Examiner*—John M. Cooney, Jr.
(74) *Attorney, Agent, or Firm*—Nicole Peffer

(57) ABSTRACT

Process for preparing flexible polyurethane foam by reacting an MDI-based polyisocyanate and a polyether polyol with a |ΔHm| of at least 30 J/g and a Tm of 4° C. and more.

16 Claims, No Drawings

US 6,579,912 B2

PROCESS FOR PREPARING A FLEXIBLE POLYURETHANE FOAM

CROSS REFERENCE TO RELATED APPLICATIONS

This application is a continuation of international application PCT EP01/05626, filed May 17, 2001.

FIELD OF INVENTION

The present invention is related to a process for preparing a flexible polyurethane foam and to such foams having specific properties. More specifically, the present invention is related to a process for preparing a flexible polyurethane foam using a polyoxyethylene polyoxypropylene polyol having special properties and a polyisocyanate having a high 4,4'-diphenylmethane diisocyanate (4,4'-MDI) content.

BACKGROUND OF THE INVENTION

Processes for preparing flexible foams from polyols having a high oxyethylene (EO) content and a polyisocyanate having a high 4,4'-MDI content have been disclosed in EP 547765. The examples shown in EP 547765 give low density foams with a low resilience.

Co-pending application WO 00/55232 discloses a process for making a moulded polyurethane material, like a flexible polyurethane foam, by reacting 4,4'-diphenylmethane diisocyanate, a polyol having a high oxyethylene content and water.

Pending PCT patent application PCT/EP01/00553 is related to a process for making moulded flexible polyurethane foams, using a polyisocyanate-reactive composition comprising 80–100% by weight of a polyether polyol having an average nominal functionality of 2–6, an average equivalent weight of 750–5000, an average molecular weight of 2000–10000, an oxyethylene content of 60–90% by weight and a primary hydroxyl content of 70–100%.

Surprisingly, it has been found that when a special class of polyols is used stable foams can be made which show a high resilience at low density, have low recession and/or a low hysteresis loss and more open cells. Foams when made in a mould can be easily demoulded even if no external mould release agent is applied after the first moulding has been made.

Foams can be made more easily because the viscosity of the raw material is low. Further the formulation latitude is wider and in general foam properties remain acceptable at lower densities.

SUMMARY OF THE INVENTION

Therefore, the present invention is concerned with a process for preparing a flexible polyurethane foam having an apparent overall density of 15–150 kg/m³ comprising reacting a polyisocyanate and an isocyanate-reactive composition in the presence of water, wherein the reaction is conducted at an isocyanate index of 50 to 130, the polyisocyanate consists of a) 80–100% by weight of diphenylmethane diisocyanate comprising at least 40%, preferably at least 60% and most preferably at least 85% by weight of 4,4'-diphenylmethane diisocyanate and/or a derivative of said diphenylmethane diisocyanate which derivative has an NCO value of at least 20% by weight (polyisocyanate a), and b) 20–0% by weight of another polyisocyanate (polyisocyanate b), and wherein the isocyanate-reactive composition consists of a) 10–100 and preferably 30–100 and most preferably 50–100% by weight of a polyether polyol (polyol a)) having an average nominal functionality of 2–8, an average equivalent weight of 750–5000, an average molecular weight of 2000–12000, an oxyethylene (EO) content of 20–90% by weight calculated on the weight of the polyether polyol, a melting enthalpy, $|\Delta Hm|$, of at least 30 J/g and a melting temperature, Tm, of 4° C. or more, excluding such polyols having an oxyethylene content of 60–90% by weight and a primary hydroxyl content of 70–100% and excluding such polyols having an oxyethylene content of at least 50% by weight and being random polyoxyethylene polyoxypropylene polyols and b) 90–0 and preferably 70–0 and most preferably 50–0% by weight of one or more other isocyanate-reactive compounds (isocyanate-reactive compound b)) excluding water.

DETAILED DESCRIPTION OF THE INVENTION

The present invention is concerned with a process for preparing a flexible polyurethane foam having an apparent overall density of 15–150 kg/m³ comprising reacting a polyisocyanate and an isocyanate-reactive composition in the presence of water, wherein the reaction is conducted at an isocyanate index of 50 to 130, the Page 4 of 17 polyisocyanate consists of a) 80–100% by weight of diphenylmethane diisocyanate comprising at least 40%, preferably at least 60% and most preferably at least 85% by weight of 4,4'-diphenylmethane diisocyanate and/or a derivative of said diphenylmethane diisocyanate which derivative has an NCO value of at least 20% by weight (polyisocyanate a), and b) 20–0% by weight of another polyisocyanate (polyisocyanate b), and wherein the isocyanate-reactive composition consists of a) 10–100 and preferably 30–100 and most preferably 50–100% by weight of a polyether polyol (polyol a)) having an average nominal functionality of 2–8, an average equivalent weight of 750–5000, an average molecular weight of 2000–12000, an oxyethylene (EO) content of 20–90% by weight calculated on the weight of the polyether polyol, a melting enthalpy, $|\Delta Hm|$, of at least 30 J/g and a melting temperature, Tm, of 4° C. or more, excluding such polyols having an oxyethylene content of 60–90% by weight and a primary hydroxyl content of 70–100% and excluding such polyols having an oxyethylene content of at least 50% by weight and being random polyoxyethylene polyoxypropylene polyols and b) 90–0 and preferably 70–0 and most preferably 50–0% by weight of one or more other isocyanate-reactive compounds (isocyanate-reactive compound b)) excluding water.

The foams have an apparent overall density of 15–150 kg/m³ (ISO845), preferably of 25–60 kg/m³ and a resilience (ISO 8307) of 45–80% and preferably of 50–80% and most preferably of 55–80%.

In the context of the present invention the following terms have the following meaning:
1) isocyanate index or NCO index or index:
    the ratio of NCO-groups over isocyanate-reactive hydrogen atoms present in a formulation, given as a percentage:

$$\frac{[NCO] \times 100}{[\text{active hydrogen}]}(\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The expression "polyurethane foam" as used herein refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams) and with polyols, aminoalcohols and/or polyamines as isocyanate-reactive compounds.

5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

Preferably, the polyisocyanate a) is selected from 1) a diphenylmethane diisocyanate comprising at least 40%, preferably at least 60% and most preferably at least 85% by weight of 4,4'-diphenylmethane diisocyanate and the following preferred derivatives thereof: 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2–4 and an average molecular weight of at most 1000; 4) a prepolymer having an NCO value of 20% by weight or more and which is the reaction product of an excess of any of the aforementioned polyisocyanates 1–3) and of a polyether polyol having an average nominal functionality of 2–6, an average molecular weight of 2000–10000 and preferably an hydroxyl value of 15 to 60 mg KOH/g, and 5) mixtures of any of the aforementioned polyisocyanates.

Polyisocyanate 1) comprises at least 40% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI.

It is to be noted that the amount of 2,2'-MDI in the isomeric mixtures is rather at an impurity level and in general will not exceed 2% by weight, the remainder of the up to 60% by weight being 2,4'-MDI. Polyisocyanates as these are known in the art and commercially available. For example, SUPRASEC™ MPR isocyanate is commercially available from Huntsman Polyurethanes, which is a business of Huntsman International LLC (SUPRASEC is a trademark of Huntsman International LLC).

The carbodiimide and/or uretonimine modified variants of the above polyisocyanate 1) are also known in the art and commercially available (e.g. SUPRASEC 2020 isocyanate).

Urethane modified variants of the above polyisocyanate 1) are also known in the art and commercially available (e.g. SUPRASEC 2021 isocyanate).

Aforementioned prepolymers of polyisocyanate 1) having an NCO value of 20% by weight or more are also known in the art. Preferably the polyol used for making these prepolymers is selected from polyoxyethylene polyoxypropylene polyols having an average nominal functionality of 2–4, an average molecular weight of 2500–8000, and preferably an hydroxyl value of 15–60 mg KOH/g and either an oxyethylene content of 5–25% by weight, which oxyethylene preferably is at the end of the polymer chains, or an oxyethylene content of 50–90% by weight, which oxyethylene preferably is randomly distributed over the polymer chains.

The other polyisocyanate b) may be chosen from aliphatic, cycloaliphatic, araliphatic and, preferably, aromatic polyisocyanates, such as toluene diisocyanate in the form of its 2,4 and 2,6-isomers and mixtures thereof and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate and polymethylene polyphenylene polyisocyanates may be used as well.

Polyol a) is selected from those, which have an average nominal functionality of 2–8 and preferably of 2–6, an average equivalent weight of 750–5000 and preferably of 1000–4000 and a molecular weight of 2000–12000 and preferably of 2500–10000. The $|\Delta Hm|$ and Tm are measured by Differential Scanning Calorimetry (DSC) with a Mettler DSC30 instrument. Typical sample weights are 10–15 mg. The DSC is calibrated with an indium standard for temperature and heat flow. Samples are scanned from $-100$ to $+100°$ C. at a heating rate of $20°$ C./min. Two scans are made. The temperature of the melting endotherm (melting temperature, Tm) and corresponding peak integral (melting enthalpy, Delta Hm) are reported from the second scan to eliminate possible interference from the sample thermal history.

These polyols preferably are polyoxyalkylene polyoxyethylene polyols and more preferably polyoxypropylene polyoxyethylene polyols wherein the distribution of the oxyethylene and oxypropylene groups is of the so-called block-copolymer type or a combination of block-copolymer and random distribution; several blocks of oxyethylene groups and several blocks of oxypropylene groups may be present. As an example, a few polyols are shown with their physical data:

|  | OH value, mg KOH/g | EO content, % by weight | primary, hydroxyl content, % | Tm | \|ΔHm\|, J/g | According to definition of polyol a) |
|---|---|---|---|---|---|---|
| Polyol 1 | 33 | 50 | 55 | 11 | 46 | Yes |
| Polyol 2 | 40 | 71 | 60 | 16 | 70 | Yes |
| CARADOL ™ sa 36-02, (from Shell) | 40 | 76 | 92 | 9 | 53 | No |
| ARCOL ™ 2580, (from Arco) | 42 | 76 | 42 | 2 | 38 | No |

Polyol 2 was made as follows. 297.2 parts by weight (pbw) glycerol and 48 pbw of an aqueous solution of 50 wt % of KOH were added to an autoclave which was subsequently three times purged with N2 and then vacuum stripped at 125° C. to remove the water down to 0.08 wt %. Then 2126 pbw propylene oxide (PO) was added and allowed to react at 120° C. for 2 hours, followed by vacuum stripping. At this stage, the hydroxyl value of the polyol was 247 mg KOH/g. Then 4490 pbw EO/PO (86/14, wt/wt) mixture was added at 120° C. over a period of 2 hours, the reaction was continued for another 1.5 hours followed by vacuum stripping for 30 minutes. The hydroxyl value of the polyol was 86 mg KOH/g. Of the polyol so obtained 2000 pbw was removed from the reactor. To the remainder 4937 pbw, 5375 pbw of a EO/PO (86/14, wt/wt) mixture was added over a period of 4 hours at 120° C. and allowed to react for another 1.5 hours followed by vacuum stripping at 120° C. for 1 hour. 533.8 pbw aqueous solution of 4.5 wt % adipic acid was added to neutralise the KOH catalyst, then the mixture was heated up to 125° C. and vacuum stripped for 2.5 hours. The polyol was filtrated at 125° C. for 30 minutes. The polyol obtained has an OHv of 40 mg KOH/g, an overall EO content of 71 wt %, a primary hydroxyl content of 60% and a PO block linked to the initiator of 15 wt % relative to the total amount of EO and PO units in the polyol.

Polyol 1 was made similarly but adjusting the amounts of PO and EO used so as to obtain a polyol as indicated above with a PO block linked to the initiator of 40% weight relative to the total amount of EO and PO units in the polyol.

Mixtures of polyols may be used. Methods to prepare such polyols are known. The other isocyanate-reactive compounds, which may be used in an amount of 0–90% by weight may be selected from polyether polyamines, polyester polyols and polyether polyols (different from the above described ones) having a molecular weight of 2000 or more and in particular from such other polyether polyols, which may be selected from polyoxyethylene polyols, polyoxypropylene polyols, polyoxyethylene polyoxypropylene polyols having an oxyethylene content of less than 20% or more than 90% by weight and polyoxyethylene polyoxypropylene polyols which have been excluded in polyol a). Preferred polyoxyethylene polyoxypropylene polyols are those having an oxyethylene content of 5–30% and preferably 10–25% by weight, wherein all the oxyethylene groups are at the end of the polymer chains (so-called EO-tipped polyols) and those having an oxyethylene content of 60–90% by weight and, having all oxyethylene groups and oxypropylene groups randomly distributed and a primary hydroxyl content of 20–60%, calculated on the number of primary and secondary hydroxyl groups in the polyol. Preferably, these other polyether polyols have an average nominal functionality of 2–6, more preferably 2–4 and an average molecular weight of 2000–10000, more preferably of 2500–8000. Further, the other isocyanate-reactive compounds may be selected from chain extenders and cross-linkers, which are isocyanate-reactive compounds having an average molecular weight below 2000, preferably up to 1000 and a functionality of 2–8. Examples of such chain-extenders and cross-linkers are ethylene glycol, butanediol, diethylene glycol, propylene glycol, dipropylene glycol, glycerol, trimethylolpropane, pentaerythritol, sucrose, sorbitol, mono-, di- and triethanolamine, ethylenediamine, toluenediamine, diethyltoluene diamine, polyoxyethylene polyols having an average nominal functionality of 2–8 and an average molecular weight of less than 2000 like ethoxylated ethylene glycol, butane diol, diethylene glycol, propylene glycol, dipropylene glycol, glycerol, trimethylolpropane, pentaerythritol, sucrose and sorbitol having said molecular weight, and polyether diamines and triamines having an average molecular weight below 2000.

Mixtures of the aforementioned other isocyanate-reactive compounds may be used as well. The polyols may comprise dispersions or solutions of addition or condensation polymers in polyols of the types described above. Such modified polyols, often referred to as "polymer polyols" have been fully described in the prior art and include products obtained by the in situ polymerisation of one or more vinyl monomers, for example styrene and/or acrylonitrile, in the above polyether polyols, or by the in situ reaction between a polyisocyanate and an amino- and/or hydroxy-functional compound, such as triethanolamine and/or hydrazine in the above polyol. Polyoxyalkylene polyols containing from 1 to 50% by weight of dispersed polymer are particularly useful. Particle sizes of the dispersed polymer of less than 50 microns are preferred.

During the last years, several methods have been described to prepare polyether polyols having a low level of unsaturation. These developments have made it possible to use polyether polyols at the higher end of the molecular weight range since such polyols can now be prepared with an acceptably low level of unsaturation. According to the present invention polyols having a low level of unsaturation may be used as well. In particular such high molecular weight polyols having a low level of unsaturation may be used.

If the isocyanate-reactive composition according to the present invention comprises more than 20% by weight of isocyanate-reactive compound b), the amount exceeding the amount of 20% by weight preferably is a polyoxyethylene polyoxypropylene polyol which has been excluded in polyol a).

Still further the following optional ingredients may be used: catalysts enhancing the formation of urethane bonds like tin catalysts like tin octoate and dibutyltindilaurate, tertiary amine catalysts like triethylenediamine and imidazoles like dimethylimidazole and other catalysts like maleate esters and acetate esters; surfactants; fire retardants; smoke suppressants; UV-stabilizers; colorants; microbial inhibitors; fillers Water is used as blowing agent optionally together with other blowing agents known in the art like hydrocarbons, so called CFC's and HCFC's, $N_2$ and $CO_2$. Most preferably water is used as the blowing agent, optionally together with $CO_2$. The amount of blowing agent will depend on the desired density. The amount of water will be between 0.8–5% by weight, calculated on the amount of all other ingredients used.

The reaction to prepare the foams is conducted at an NCO index of 50–130 and preferably of 70–120.

The ingredients used for making the foams may be fed separately to a mixing device. Preferably, one or more of the isocyanate-reactive ingredients are pre-mixed, optionally together with the optional ingredients, before being brought into contact with the polyisocyanate.

The foams may be made according to the free rise process or the restricted rise process; they may be made in open or closed moulds, according to the so-called batch-block process, a continuous slabstock process, a continuous lamination process or a continuous backing process like carpet- or textile-backing.

The foams are useful in furniture, bedding, cushioning and automotive seating.

EXAMPLES

The following examples are provided to illustrate the invention and should not be construed as limiting thereof.

Foams were made in open 10 l buckets by adding, mixing and allowing to react 47 parts by weight (pbw) of a 30/70 w/w mixture of SUPRASEC 2020 isocyanate and SUPRASEC MPR isocyanate and 103 pbw of a polyol mixture comprising 100 pbw of previously described polyol 1) or polyol 2), 0.5 pbw of D33LV (a catalyst from Air Products) and 2.5 pbw of water. The reaction was conducted at an isocyanate index of 108. SUPRASEC 2020 isocyanate is a uretonimine-modified 4,4'-MDI from Huntsman Polyurethanes having an NCO value of 29.3% by weight. SUPRASEC MPR isocyanate is 4,4'-MDI from Huntsman Polyurethanes. The properties of the foams obtained were as follows:

|  | Polyol 1 | Polyol 2 |
|---|---|---|
| recession, % | 0 | 1.9 |
| closed/open cells | open | open |
| compression load deflection at 40%, kPa (ISO 3386) | 2.7 | 3.7 |
| hysteresis loss, % - ISO 3386 | 18.5 | 19.4 |
| resilience, %, ISO 8307 | 62 | 66 |
| free rise density, kg/m³, ISO 845 | 43 | 41 |

What is claimed is:

1. A process for preparing a flexible polyurethane foam having an apparent overall density of 15–150 kg/m³ comprising the step of reacting a polyisocyanate and an isocyanate-reactive composition in the presence of water, wherein the reaction is conducted at an isocyanate index of 50 to 130, and the polyisocyanate comprises:
   a) 80–100% by weight of a diphenylmethane diisocyanate comprising at least 40% by weight of 4,4'-diphenylmethane diisocyanate and/or a derivative of said diphenylmethane diisocyanate, which derivative has an NCO value of at least 20% by weight, and
   b) 20–0% by weight of another polyisocyanate and the isocyanate-reactive composition comprises:
   a) 10–100% by weight of a polyether polyol having an average nominal functionality of 2–8, an average equivalent weight of 750–5000, an average molecular weight of 2000–12000, an oxyethylene content of 20–90% by weight calculated on the weight of the polyether polyol, a melting enthalpy, $|\Delta Hm|$, of at least 30 J/g and a melting temperature, Tm, of 4° C. or more, excluding such polyols having an oxyethylene content of 60–90% by weight and a primary hydroxyl content of 70–100% and excluding such polyols having an oxyethylene content of at least 50% by weight and being random polyoxyethylene polyoxypropylene polyols, and
   b) 90–0% by weight of one or more other isocyanate-reactive compounds excluding water.

2. The process of claim 1, wherein the flexible polyurethane foam has an apparent overall density of density of 25–60 kg/m³.

3. The process of claim 1, wherein the amount of water is 0.8–5% by weight calculated on all other ingredients used.

4. The process of claim 2, wherein the amount of water is 0.8–5% by weight calculated on all other ingredients used.

5. The process of claim 1, wherein the isocyanate index is 70–120.

6. The process of claim 2, wherein the isocyanate index is 70–120.

7. The process of claim 3, wherein the isocyanate index is 70–120.

8. The process of claim 4, wherein the isocyanate index is 70–120.

9. The process of claim 1, wherein the average nominal functionality of polyether polyol a) is 2–6, the average equivalent weight is 1000–4000 and the average molecular weight is 2500–10000 and the diphenylmethane diisocyanate comprises at least 85% by weight of 4,4'-diphenylmethane diisocyanate and/or a derivative of said diphenylmethane diisocyanate which derivative has an NCO value of at least 20% by weight.

10. The process of claim 2, wherein the average nominal functionality of polyether polyol a) is 2–6, the average equivalent weight is 1000–4000 and the average molecular weight is 2500–10000 and the diphenylmethane diisocyanate comprises at least 85% by weight of 4,4'-diphenylmethane diisocyanate and/or a derivative of said diphenylmethane diisocyanate which derivative has an NCO value of at least 20% by weight.

11. The process of claim 3, wherein the average nominal functionality of polyether polyol a) is 2–6, the average equivalent weight is 1000–4000 and the average molecular weight is 2500–10000 and the diphenylmethane diisocyanate comprises at least 85% by weight of 4,4'-diphenylmethane diisocyanate and/or a derivative of said diphenylmethane diisocyanate which derivative has an NCO value of at least 20% by weight.

12. The process of claim 4, wherein the average nominal functionality of polyether polyol a) is 2–6, the average equivalent weight is 1000–4000 and the average molecular weight is 2500–10000 and the diphenylmethane diisocyanate comprises at least 85% by weight of 4,4'-diphenylmethane diisocyanate and/or a derivative of said diphenylmethane diisocyanate which derivative has an NCO value of at least 20% by weight.

13. The process of claim 5, wherein the average nominal functionality of polyether polyol a) is 2–6, the average equivalent weight is 1000–4000 and the average molecular weight is 2500–10000 and the diphenylmethane diisocyanate comprises at least 85% by weight of 4,4'- diphenylmethane diisocyanate and/or a derivative of said diphenylmethane diisocyanate which derivative has an NCO value of at least 20% by weight.

14. The process of claim 6, wherein the average nominal functionality of polyether polyol a) is 2–6, the average equivalent weight is 1000–4000 and the average molecular weight is 2500–10000 and the diphenylmethane diisocyanate comprises at least 85% by weight of 4,4'-diphenylmethane diisocyanate and/or a derivative of said diphenylmethane diisocyanate which derivative has an NCO value of at least 20% by weight.

15. The process of claim 7, wherein the average nominal functionality of polyether polyol a) is 2–6, the average equivalent weight is 1000–4000 and the average molecular weight is 2500–10000 and the diphenylmethane diisocyanate comprises at least 85% by weight of 4,4'-diphenylmethane diisocyanate and/or a derivative of said diphenylmethane diisocyanate which derivative has an NCO value of at least 20% by weight.

16. The process of claim 8, wherein the average nominal functionality of polyether polyol a) is 2–6, the average equivalent weight is 1000–4000 and the average molecular weight is 2500–10000 and the diphenylmethane diisocyanate comprises at least 85% by weight of 4,4'-diphenylmethane diisocyanate and/or a derivative of said diphenylmethane diisocyanate which derivative has an NCO value of at least 20% by weight.

\* \* \* \* \*